United States Patent
Sheelvant et al.

(10) Patent No.: US 11,836,352 B2
(45) Date of Patent: Dec. 5, 2023

(54) DETECTING AN ABNORMAL EVENT WHILE DATA STORAGE EQUIPMENT IS IN TRANSIT

(71) Applicant: EMC IP Holding Company LLC, Hopkinton, MA (US)

(72) Inventors: Girish Sheelvant, Hopkinton, MA (US); Natasha Gaurav, Hopkinton, MA (US); Himabindu Tummala, South Grafton, MA (US); Gregory W. Lazar, Upton, MA (US); Scott E. Joyce, Foxboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 590 days.

(21) Appl. No.: 16/522,974

(22) Filed: Jul. 26, 2019

(65) Prior Publication Data
US 2021/0026539 A1   Jan. 28, 2021

(51) Int. Cl.
*G06F 3/06* (2006.01)
*H04W 4/021* (2018.01)
(Continued)

(52) U.S. Cl.
CPC ............ *G06F 3/0619* (2013.01); *B60L 53/80* (2019.02); *G06F 3/0607* (2013.01); *G06F 3/0625* (2013.01); *G06F 3/0653* (2013.01); *G06Q 10/0635* (2013.01); *G06Q 10/0833* (2013.01); *H04W 4/021* (2013.01); *H04W 4/027* (2013.01)

(58) Field of Classification Search
CPC .... G06F 3/0619; G06F 3/0607; G06F 3/0625; G06F 3/0653; B60L 53/80; G06Q 10/0635; G06Q 10/0833; H04W 4/021; H04W 4/027
See application file for complete search history.

(56) References Cited

U.S. PATENT DOCUMENTS 6,442,532 B1 * 8/2002 Kawan ................ G06Q 20/367
705/36 R
6,550,029 B1   4/2003 Bailey et al.
(Continued)

OTHER PUBLICATIONS

Russell, Sean, Real-time monitoring and validation of waste transportation using intelligent agents and pattern recognition, University College Dublin, May 2015.*
(Continued)

*Primary Examiner* — Nathan Erb
(74) *Attorney, Agent, or Firm* — BainwoodHuang

(57) ABSTRACT

Techniques are directed to detecting an abnormal event while data storage equipment is in transit. Such techniques involve receiving a series of sensor signals from a set of sensors affixed to the data storage equipment. The series of sensor signals identifies a series of positional integrity measurements for the data storage equipment while the data storage equipment is in transit. Such techniques further involve performing a series of comparison operations that compares the series of positional integrity measurements to a set of range. Such techniques further involve, based on the series of comparison operations, providing an abnormal event signal in response to a particular positional integrity measurement falling outside a corresponding range of the set of ranges.

20 Claims, 5 Drawing Sheets

(51) Int. Cl.
*B60L 53/80* (2019.01)
*H04W 4/02* (2018.01)
*G06Q 10/0833* (2023.01)
*G06Q 10/0635* (2023.01)

(56) References Cited

U.S. PATENT DOCUMENTS

| | | | |
|---|---|---|---|
| 8,006,842 | B1 | 8/2011 | Loughlin, Jr. et al. |
| 8,458,483 | B1 | 6/2013 | Bailey et al. |
| 8,749,239 | B2 | 6/2014 | Nielsen et al. |
| 9,552,569 | B1 | 1/2017 | Quan et al. |
| 10,592,846 | B1 | 3/2020 | Gaurav et al. |
| 2004/0243285 | A1 | 12/2004 | Gounder |
| 2005/0080566 | A1* | 4/2005 | Vock ................ A61B 5/22 702/2 |
| 2005/0253703 | A1 | 11/2005 | He et al. |
| 2007/0296581 | A1 | 12/2007 | Schnee et al. |
| 2008/0129488 | A1 | 6/2008 | Hill |
| 2010/0069087 | A1 | 3/2010 | Chow et al. |
| 2012/0112907 | A1* | 5/2012 | Flath .................... G06F 13/409 340/540 |
| 2013/0342343 | A1 | 12/2013 | Harring et al. |
| 2014/0372335 | A1 | 12/2014 | Jones et al. |
| 2015/0199597 | A1* | 7/2015 | Merriam ................ G06Q 10/08 358/1.14 |
| 2015/0347231 | A1* | 12/2015 | Gopal ................. H03M 13/159 714/764 |
| 2016/0105207 | A1 | 4/2016 | Rosen et al. |
| 2016/0110975 | A1* | 4/2016 | Oppenheimer ........ G06Q 10/08 340/572.1 |
| 2016/0338907 | A1* | 11/2016 | Rice .................... B65D 81/3813 |
| 2016/0379165 | A1 | 12/2016 | Moakley |
| 2018/0094775 | A1* | 4/2018 | Jacobson ................. F17D 5/02 |
| 2018/0192446 | A1* | 7/2018 | Skobov ................. H04W 76/11 |

OTHER PUBLICATIONS

Enhanced Logistics Tracking and Monitoring Through Sensor Technology; Plinksky, Janina; Rodgers, Jerry; Army Logistician, PB 700-08-04 vol. 40, Issue 4 (Year: 2008).

* cited by examiner

DETECTING AN ABNORMAL EVENT WHILE DATA STORAGE EQUIPMENT IS IN TRANSIT

BACKGROUND

A conventional data storage array includes storage processors and an array of storage devices (e.g., flash memory drives, magnetic disk drives, etc.). During operation, the storage processors write host data into the array of storage devices and read host data from the array of storage devices on behalf of one or more host computers.

Typically, the manufacturer of the data storage array assembles and tests the data storage array at a manufacturing facility prior to shipping the data storage array to the customer. Once the data storage array reaches the customer's site, the customer connects the data storage array to main power (e.g., street power), turns on the data storage array, and operates the data storage array.

SUMMARY

Unfortunately, there are deficiencies to the above described conventional approach to simply assembling and testing the data storage array at the manufacturing facility prior to shipping the data storage array to the customer. Along these lines, the manufacturer may hire a third party service to transport the data storage array from the manufacturing facility to the customer's site. While the data storage array is being handled by the third party service, the data storage array may be improperly tilted (e.g., shipped sideways rather than remain upright as required by the manufacturer), succumb to a sudden impact, sustain damage to vibration exceeding a certain tolerance for over a certain amount of time, combinations thereof, and so on.

Additionally, if the data storage array encounters improper operation when the customers turns on the data storage array, there is little to no way for the customer and/or manufacturer to determine whether the problem is due to improper assembly and/or testing, or due to improper shipping. Moreover, if the problem is due to improper shipping, there is no way for the manufacture to pin point the cause (e.g., the location, the type of event, etc.) in order to remedy the situation.

In contrast to the above-described conventional approach to simply assembling and testing a data storage array at the manufacturing facility prior to shipping the data storage array to the customer, improved techniques are directed to detecting an abnormal event while data storage equipment is in transit. Such techniques involve electronically monitoring or sensing positional integrity of the data storage equipment even when the data storage equipment is turned off and being transported. Along these lines, an apparatus affixes to the data storage equipment and may utilize battery backup power from a battery backup power supply of the data storage equipment. Accordingly, the sender of the data storage equipment will know if the shipping company mishandled the data storage equipment. In some arrangements, the apparatus captures details of the abnormal event and may even wirelessly transmit such details in real time to the entity (e.g., via a data center) that originally sent the data storage equipment.

One embodiment is directed to a method of detecting an abnormal event while data storage equipment is in transit. The method includes receiving a series of sensor signals from a set of sensors affixed to the data storage equipment. The series of sensor signals identifies a series of positional integrity measurements for the data storage equipment while the data storage equipment is in transit. The method further includes performing a series of comparison operations that compares the series of positional integrity measurements to a set of range. The method further includes, based on the series of comparison operations, providing an abnormal event signal in response to a particular positional integrity measurement falling outside a corresponding range of the set of ranges.

In some arrangements, the set of sensors includes multiple motion sensing circuits. Additionally, receiving the series of sensor signals from the set of sensors affixed to the data storage equipment includes acquiring multiple motion signals from the multiple motion sensing circuits while storage processing circuitry of the data storage equipment is turned off.

In some arrangements, the data storage equipment includes a battery backup power source that provides battery backup power to the data storage equipment to enable the data storage equipment to perform data storage operations during loss of primary power from a primary power source. Additionally, the multiple motion sensing circuits reside within an apparatus that is attached to the data storage equipment. Furthermore, acquiring the multiple motion signals from the multiple motion sensing circuits includes obtaining the multiple motion signals in response to the apparatus consuming battery backup power from the backup power source of the data storage equipment.

In some arrangements, the apparatus further includes an event log (e.g., a database or repository). Additionally, providing the abnormal event signal includes storing an abnormal event entry in an event log of the apparatus. The abnormal event entry identifies the particular positional integrity measurement, a time for the particular positional integrity measurement, and a geolocation for the particular positional integrity measurement. Other details may be identified as well (e.g., temperature, humidity, shipping company, etc.).

In some arrangements, the apparatus further includes a wireless communications interface. Additionally, providing the abnormal event signal further includes transmitting an abnormal event notification to an external data center via the wireless communications interface.

In some arrangements, providing the abnormal event signal further includes transmitting the event log to an external data center via the wireless communications interface. Along these lines, the method may include storing other entries in the event log of the apparatus while the data storage equipment is in transit to enable the event log to describe a positional integrity history for the data storage equipment. Accordingly, the data center is able to obtain all events including events that occur before and after an abnormal event.

In some arrangements, the multiple motion sensing circuits includes a set of gyroscope circuits. Additionally, obtaining the multiple motion signals includes receiving a series of gyroscope signals from the set of gyroscope circuits, the series of gyroscope signals identifying angular positioning of the data storage equipment while the data storage equipment is in transit.

In some arrangements, performing the series of comparison operations includes, based on the series of gyroscope signals, comparing a series of angular positions of the data storage equipment to a set of tilt ranges to determine whether the data storage equipment violates an upright requirement imposed on the data storage equipment.

In some arrangements, the multiple motion sensing circuits includes a set of accelerometer circuits. Additionally, obtaining the multiple motion signals includes receiving a series of accelerometer signals from the set of accelerometer circuits, the series of accelerometer signals identifying vibrational activity of the data storage equipment while the data storage equipment is in transit.

In some arrangements, performing the series of comparison operations includes, based on the series of accelerometer signals, comparing a series of vibrational measurements of the data storage equipment to a set of vibration ranges to determine whether the data storage equipment violates vibration restriction imposed on the data storage equipment.

In some arrangements, the multiple motion sensing circuits includes a global positioning system (GPS) circuit. Additionally, obtaining the multiple motion signals include receiving a series of GPS signals from the GPS circuit, the series of GPS signals identifying a series of geolocations for the data storage equipment while the data storage equipment is in transit.

In some arrangements, performing the series of comparison operations includes, based on the series of GPS signals, comparing the series of geolocations for the data storage equipment to a set of geolocation ranges to determine whether the data storage equipment violates a geolocation restriction imposed on the data storage equipment.

In some arrangements, the method further includes, after the storage processing circuitry of the data storage equipment is turned on, continuing to monitor the data storage equipment for another abnormal event based on positional integrity measurements while data storage equipment is turned on.

Another embodiment is directed to a data storage assembly that includes data storage equipment which is constructed and arranged to perform data storage operations on behalf of a set of host computers. The data storage assembly further includes an electronic apparatus which is constructed and arranged to detect an abnormal event while data storage equipment is in transit. The electronic apparatus includes a support member which is constructed and arranged to affix to the data storage equipment, memory supported by the support member, and control circuitry supported by the support member and coupled with the memory. The memory stores instructions which, when carried out by the control circuitry, cause the control circuitry to:
 (A) receive a series of sensor signals from a set of sensors affixed to the data storage equipment, the series of sensor signals identifying a series of positional integrity measurements for the data storage equipment while the data storage equipment is in transit,
 (B) perform a series of comparison operations that compares the series of positional integrity measurements to a set of ranges, and
 (C) based on the series of comparison operations, provide an abnormal event signal in response to a particular positional integrity measurement falling outside a corresponding range of the set of ranges.

Yet another embodiment is directed to an electronic apparatus that detects an abnormal event while data storage equipment is in transit. The electronic apparatus includes a support member which is constructed and arranged to affix to the data storage equipment, memory supported by the support member, and control circuitry supported by the support member and coupled with the memory. The memory stores instructions which, when carried out by the control circuitry, cause the control circuitry to:
 (A) receive a series of sensor signals from a set of sensors affixed to the data storage equipment, the series of sensor signals identifying a series of positional integrity measurements for the data storage equipment while the data storage equipment is in transit,
 (B) perform a series of comparison operations that compares the series of positional integrity measurements to a set of ranges, and
 (C) based on the series of comparison operations, provide an abnormal event signal in response to a particular positional integrity measurement falling outside a corresponding range of the set of ranges.

It should be understood that, in the cloud context, at least some of electronic circuitry (e.g., data center equipment) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in detecting an abnormal event while data storage equipment is in transit.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to detecting an abnormal event while data storage equipment is in transit. Such a technique involves electronically sensing positional integrity of the data storage equipment even when the data storage equipment is turned off and being transported. Along these lines, an apparatus affixes to the data storage equipment and may utilize battery backup power from a battery backup power supply of the data storage equipment. Accordingly, the operator or sender of the data storage equipment will know if the shipping company mishandled the data storage equipment. In some arrangements, the apparatus captures details of the abnormal event and may even wirelessly transmit such details to a data center in real time.

Figure 1:
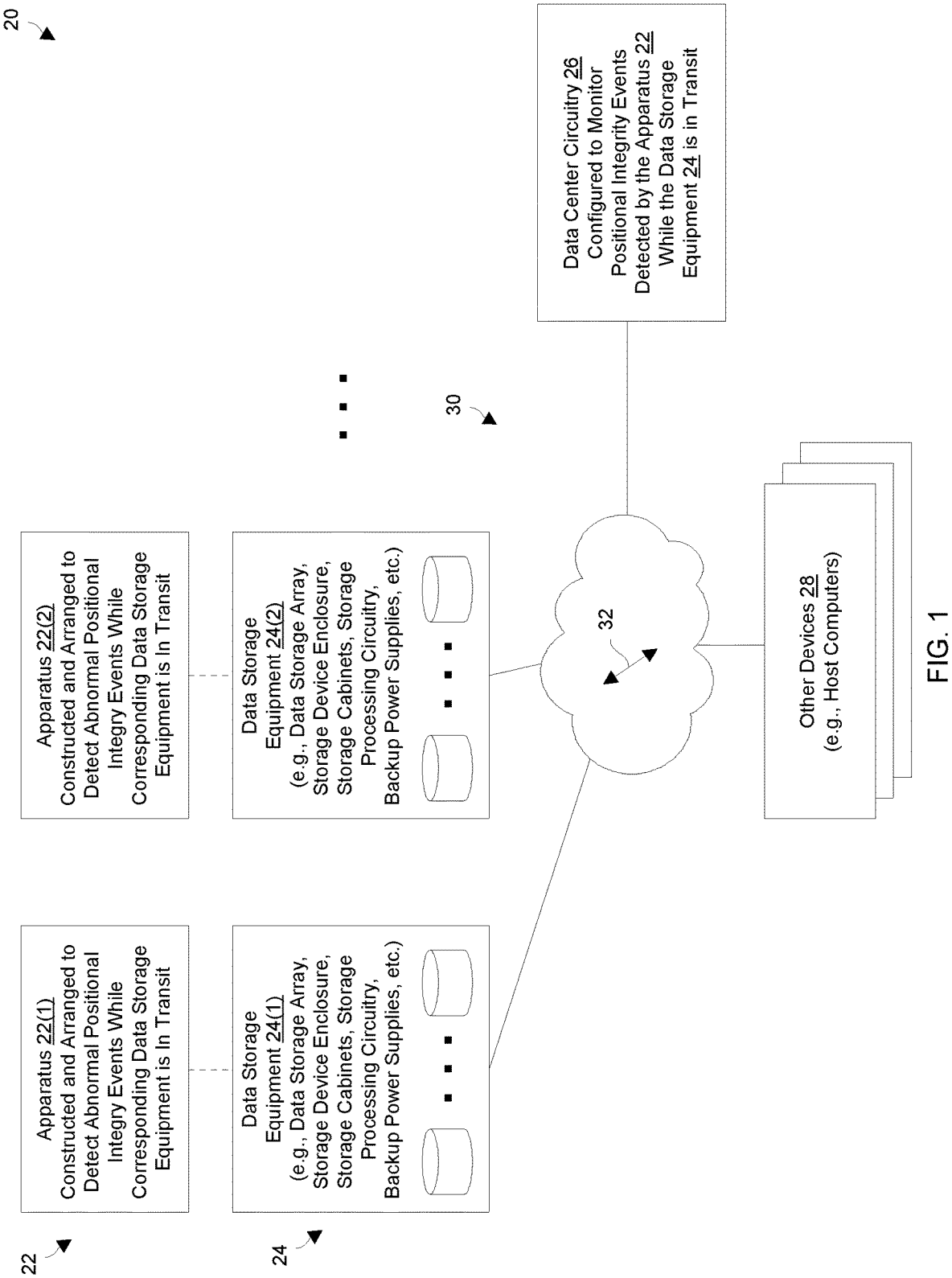
FIG. 1 is a block diagram of an electronic environment that detects an abnormal event while data storage equipment is in transit.

FIG. 1 shows an electronic environment 20 in which specialized electronic apparatus are affixed (e.g., attached, fastened, bolted, etc.) to data storage equipment (e.g., data storage systems, data storage appliances, data storage arrays, a set of peripheral devices, combinations thereof, etc.) to detect abnormal events while the data storage equipment is in transit. The electronic environment 20 includes separate electronic apparatus 22(1), 22(2), . . . (collectively, apparatus 22), data storage equipment 24(1), 24(2), . . . (collectively, data storage equipment 24), data center circuitry 26, other devices 28, and communications medium 30.

Each electronic apparatus 22 is constructed and arranged to detect an abnormal event while being affixed to particular data storage equipment 24 and while that data storage equipment 24 is in transit. In particular, such apparatus 22 electronically monitors positional integrity of that data storage equipment 24 (e.g., tilt orientation, vibration, shocks/impacts, etc.) even when the data storage equipment 24 is turned off and being transported. In some arrangements, the apparatus 22 utilizes battery backup power from a battery backup power supply of the data storage equipment 24. Additionally, in some arrangements, the apparatus 22 captures details of the abnormal event and wirelessly transmits such abnormal event details to the data center circuitry 26 in real time.

The data storage equipment 24 (e.g., data storage appliances, data storage arrays, storage enclosures, etc.) is constructed and arranged to perform data storage operations (e.g., to process SCSI requests by storing and retrieving host data) on behalf of a set of host computers (e.g., the other devices 28). By way of example, the data storage equipment 22(1) includes a set of cabinets or enclosures which hold specialized data storage hardware such as storage processing circuitry, storage devices such as flash memory drives and/or magnetic disk drives, network interfaces, power supplies, batteries for backup power, combinations thereof, and so on. In some arrangements, the storage devices form one or more tiers of storage that store various storage objects (e.g., logical units of storage or LUNs, volumes, file systems, RAID groups, combinations thereof, and so on).

It should be understood that the apparatus 22 are disposed with respective data storage equipment 24. For example, the apparatus 22(1) resides with the data storage equipment 24(1), the apparatus 22(2) resides with the data storage equipment 24(2), and so on. Each apparatus 22 may be constructed and arranged to provide location data to the data center circuitry 26 while the respective data storage equipment 22 is in transit (e.g., en route between a starting location and a destination location). Such location information may include a current geolocation or ground coordinate as well as other information such as timestamps, environmental data, alerts, and so on. Although direct lines are not explicitly shown in FIG. 1 between each apparatus 22 and the communications medium 30, it should be understood that each apparatus 22 is able to communicate with other parts of the electronic environment 20 (e.g., with the data center circuitry 26) through the communications medium 30.

In some arrangements, the apparatus 22 are separate devices having form factors similar to that of tablets, smart phones, or other mobile apparatus. In these arrangements, the apparatus 22 physically attach to the respective data storage equipment 24, e.g., via fastening hardware, via a cable, via a harness, combinations thereof, etc. In some arrangements, the apparatus 22 electrically tether to the respective data storage equipment 22 and thus may derive battery backup power from backup power supplies (e.g., batteries) of the respective data storage equipment 24 that store battery backup power in the event data storage equipment 24 loses access to primary power (e.g., street power) while performing data storage operations on behalf of host computers.

In certain arrangements, the apparatus 22 are tightly integrated with the respective data storage equipment 24. For example, the apparatus 22 may be housed within the cabinets/enclosures of the data storage equipment 24, the apparatus 22 may connected to the backplanes/mid-planes/door panels/etc. to sense whether components are tampered with, removed, etc.

In some arrangements, the apparatus 22 may perform other functions in addition to sensing for abnormal events. For example, the apparatus 22 may be also operate as, or as part of, service processor equipment that enables a human administrator to configure and/or operate the corresponding data storage equipment 24.

The data center circuitry 26 is constructed and arranged to communicate with the apparatus 22 such as to receive positional integrity and other information (e.g., events, status, conditions, etc.) of the corresponding data storage equipment 24. For example, the data center circuitry 26 obtains information for the data storage equipment 24(1) from the apparatus 22(1). Additionally, the data center circuitry 26 obtains information for the data storage equipment 24(2) from the apparatus 22(2), and so on.

The other devices 28 are constructed and arranged to perform other operations within the environment 20. For example, the other devices 28 may represent host computers that provide host input/output (I/O) requests to the data storage equipment 24 which are currently turned on and operating at different field locations (e.g., customer sites).

The communications medium 30 is constructed and arranged to connect the various components of the electronic environment 20 together to enable these components to exchange electronic signals 32 (e.g., see the double arrow 32). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting SAN-based communications, LAN-based communications, cellular communications, other forms of wireless communication, combinations thereof, etc.

During operation (i.e., when the data storage equipment 24 is turned on and connected to the communications medium 30), the data storage equipment 24 performs load and store operations on behalf of host computers. Such data storage equipment 24 may perform specialized data storage operations such as load balancing SCSI operations, tiering, data encryption/decryption, data deduplication, snapshotting, archiving/backups, data replication, data storage failover, data reconstruction/recovery, and so on.

At some point, the operator of particular data storage equipment 22 may decide to move that data storage equipment 22 from one location to another location. Regarding such a move, the operator of the particular data storage equipment 22 may have concerns regarding how the data storage equipment 24 will be handled during transport. For example, the operator may be a manufacturer that has just assembled and tested the data storage equipment 24, and now must deliver the data storage equipment 24 to a customer. As another example, the operator may be the owner of the data storage equipment 24 which currently stores important data, and now must send the data storage equipment 24 from an original operating location to a new location.

When particular data storage equipment 24 is ready for transport, an apparatus 22 is attached to the data storage equipment 24 if the apparatus 22 was not provisioned with the apparatus 22 earlier. The apparatus 22 is activated and thus begins monitoring positional integrity of the data storage equipment 24 to determine whether the data storage equipment 24 encounters an abnormal event. It should be understood that the apparatus 22 performs such operation even if the data storage equipment 24 is turned off (e.g., powered down) so that the storage processing circuitry of the data storage equipment 24 can no longer perform data storage operations.

In particular, the circuitry within the apparatus 22 acquires a series of sensor signals from a set of sensors affixed to the data storage equipment 24 (e.g., gyroscope circuitry, accelerometers, other motion detection circuits, combinations thereof, etc.). The series of sensor signals identifies a series of positional integrity measurements for the data storage equipment 24 while the data storage equipment 24 is in transit The circuitry within the apparatus 22 performs a series of comparison operations that compares the series of positional integrity measurements to a set of ranges. For example, such operations determine whether the data storage equipment 24 is tilted too far on its side, whether the data storage equipment 24 receives a significant jolt or impact, whether the data storage equipment 24 encounters extensive vibration for a prolonged time or at an extreme rate, and so on.

Based on the series of comparison operations, if the circuitry within the apparatus 22 determines that an abnormal event has occurred, the circuitry within the apparatus 22 provides an abnormal event signal. That is, the circuitry within the apparatus 22 outputs the abnormal event signal in response to a particular positional integrity measurement falling outside a corresponding range of the set of ranges. To this end, the circuitry may create an abnormal event entry in a local log or database, wirelessly transmit a notification to the data center circuitry 26, and so on.

Accordingly, the sender of the data storage equipment 24 can be informed and perhaps identify the abnormal event as the cause of any problems that are encountered once the data storage equipment 24 reaches its destination and is turned back on. Moreover, in some arrangements, each abnormal event entry identifies a particular time, a particular geolocation, etc. for the abnormal event. As a result, the details as to how the abnormal event occurred can be determined (e.g., at a transfer facility, while in a hanger, while en route in a railcar, while en route on a truck, etc.). Further details will now be provided with reference to FIG. 2.

Figure 2:
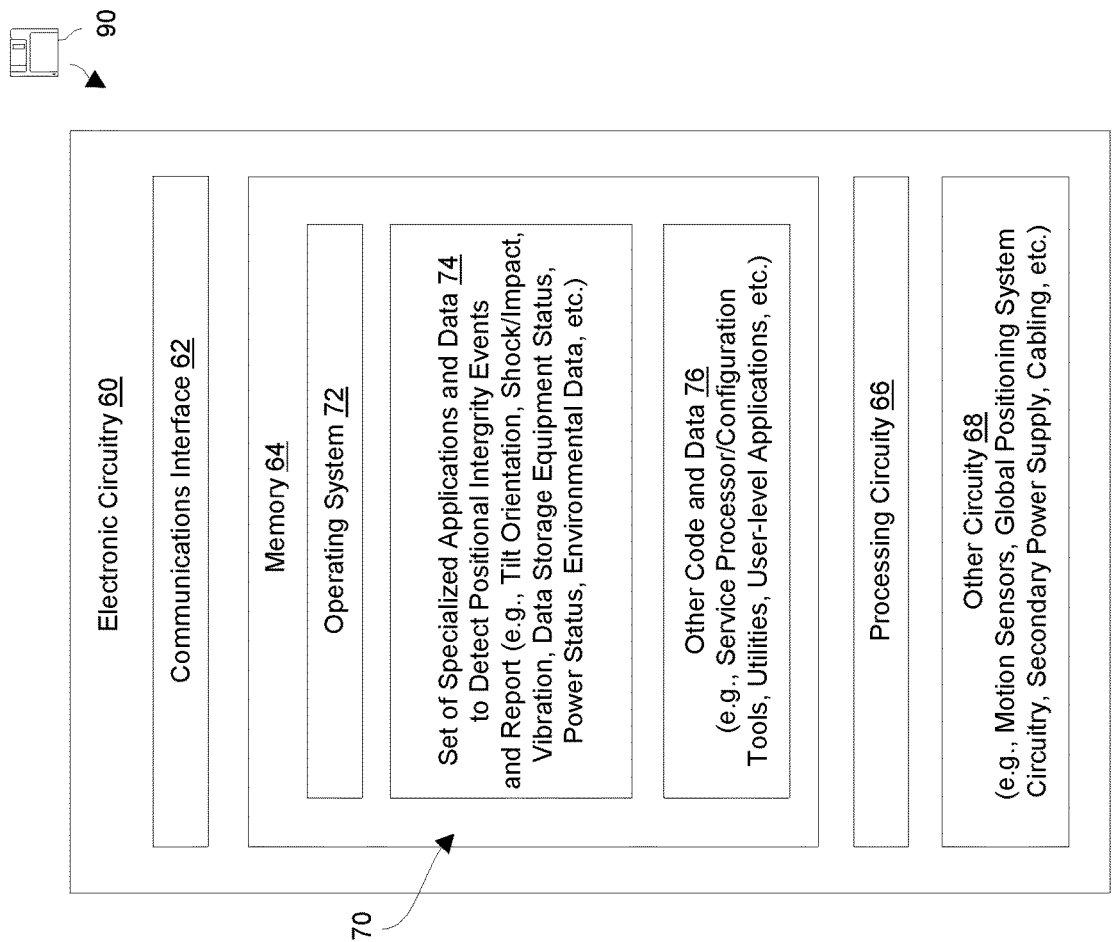
FIG. 2 is a block diagram of electronic circuitry which is used to electronically sense positional integrity of the data storage equipment while the data storage equipment is in transit.

FIG. 2 shows details of electronic circuitry 60 for an apparatus 22 which affixes to corresponding data storage equipment 24 and detects abnormal events while the data storage equipment 24 is in transit. The electronic circuitry 60 includes a communications interface 62, memory 64, processing circuitry 66, and other circuitry 68. In some arrangements, the electronic circuitry 60 is loosely coupled with the data storage equipment 24 (e.g., physically attached, electronically tethered, etc.). In other arrangements, the electronic circuitry 60 is more tightly connected to the data storage equipment 24 (e.g., the electronic circuitry 60 and the data storage equipment 24 share the same housing/cabinet, the electronic circuitry 60 is tied to a backplane or mid-plane of the data storage equipment 24, the electronic circuitry 60 connects to sensors installed within the data storage equipment 24, etc.).

The communications interface 62 is constructed and arranged to connect the electronic circuitry 60 to the communications medium 30 (also see FIG. 1) to enable communications with other devices of the electronic environment 20 (e.g., the data center circuitry 26, etc.). Such communications may be IP-based, SAN-based, cellular-based, cable-based, fiber-optic based, wireless, cloud-based, combinations thereof, and so on. Accordingly, the communications interface 62 enables the electronic circuitry 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, a set of specialized applications and data 74, and other applications and data 76. The operating system 72 is intended to refer to specialized code such as a kernel to manage resources of the electronic circuitry 60 (e.g., processor cycles, memory space, etc.), drivers (e.g., an I/O stack), and so on. The set of specialized applications and data 74 includes specialized code that enables the electronic circuitry 60 to detect abnormal positional integrity events as well as other operations (e.g., make entries into a log, identify geolocation, collect environmental information, convey that information to the data center circuitry 26, and so on. The other applications and data 76 represent other constructs for other operations such as service processor applications for configuring and managing the respective data storage system 22, user-level applications, other administrative tools, utilities, and so on.

The processing circuitry 66 is constructed and arranged to operate in accordance with the various software constructs 70 stored in the memory 64. In particular, the processing circuitry 66 operates in accordance with the set of specialized applications and data 74 to form specialized circuitry which processes sensor signals from a set of sensors to detect abnormal positional integrity events that occur while the respective data storage equipment 22 is in transit. Such specialized circuitry may be further implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 68 of the electronic circuitry 60 represents additional circuits, components, and other hardware such as global positioning system (GPS) circuitry to detect geolocation, a secondary power supply to power the electronic circuitry 60 in the absence of backup power from the data storage equipment 24, motion sensors such as a set of gyroscopes and a set of accelerometers, cabling to connect/interface the electronic circuitry 60 with the data storage equipment 24, and so on. Further details will now be provided with reference to FIG. 3.

Figure 3:
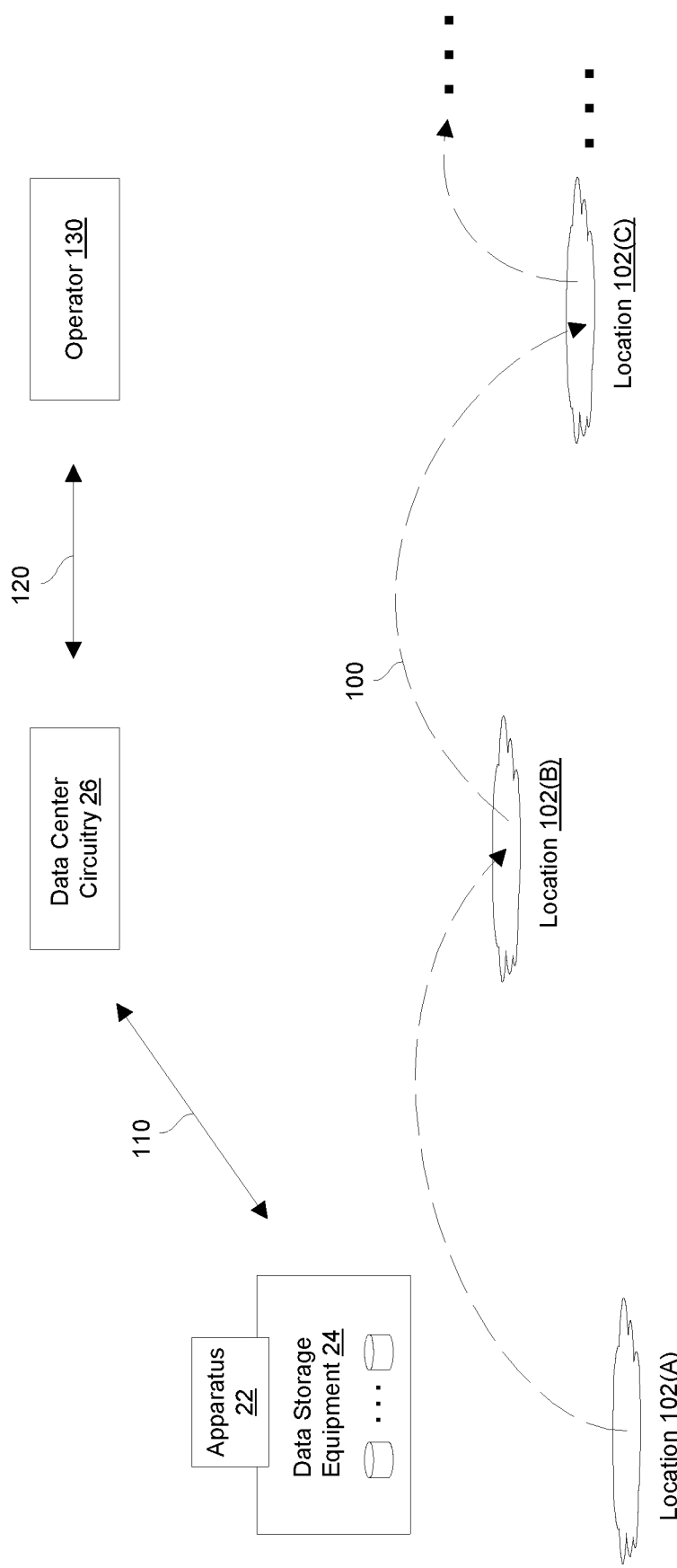
FIG. 3 is a block diagram illustrating particular details of a data storage equipment transportation situation.

FIG. 3 shows particular details of a data storage equipment transportation situation. Here, the apparatus 22 and corresponding data storage equipment 24 are in transit along a predefined route 100 formed along locations 102(A), 102(B), 102(C), etc. It should be appreciated that a third party shipping service that is different from the operator of the data storage equipment 24 may be transporting the data storage equipment 24, and that the third party shipping service might not handle the data storage equipment 24 as intended by the sender, e.g., the third party shipping service might tip the data storage equipment 24 on its side, drop the data storage equipment 24 from an undesirable height, expose the data storage equipment 24 to extensive vibration for a prolonged period of time, and so on.

However, while the apparatus 22 and the data storage equipment 24 are in transit together, the apparatus 22 continuously senses the positional integrity of the data storage equipment 24 and records an abnormal event if a set of predefined positional integrity requirements (e.g., defined by a set of positional integrity ranges) is not adhered to by the party that is transporting the data storage equipment 24. In particular, the electronic circuitry 60 of the apparatus 22 receives a series of sensor signals from a set of sensors affixed to the data storage equipment 24. Such sensor signals may include orientation signals from a set of gyroscopes, vibration/motion signals from a set of accelerometers, and so on (also see the other circuitry 68 in FIG. 2). Such signals identify a series of positional integrity measurements for the data storage equipment 24 while the data storage equipment 24 is in transit.

Based on the series of sensor signals, the electronic circuitry 60 of the apparatus 22 performs a series of comparison operations which compares the series of positional integrity measurements to a set of ranges. Such ranges may be specified by the sender as restrictions to how the data storage equipment 24 is permitted to be moved with safety margins.

Additionally, based on the series of comparison operations, the electronic circuitry 60 provides an abnormal event signal if a particular positional integrity measurement falls outside a corresponding range of the set of ranges. For example, the electronic circuitry 60 records that an abnormal event has occurred if the data storage equipment 24 is tilted too much, sustains an extreme jolt, or is exposed to prolonged heavy vibration. Such a recording of the abnormal event may be placed in a local log and/or transmitted as wireless messages 110 to the data center circuitry 26.

In some arrangements, the electronic circuitry 60 stores sensing data entries in a local log routinely and periodically transmits, as wireless messages 110, new portions of the local log to the data center circuitry 26 during routine intervals such as in response to expiration of a timer (e.g., every 15 minutes, every 30 minutes, every hour, etc.). Moreover, such wireless messages 110 may further be event driven (e.g., sent in response to detection of a tampering event, sent in response to detection of reaching a particular location 102, sent in response to detection of a lower power level, etc.). In accordance with certain embodiments, each wireless message 110 includes a location identifier that identifies a current location of the apparatus 22 and the data storage equipment 24. The location identifier may include or be based on a set of GPS coordinates from GPS circuitry within either the apparatus 22 or the data storage equipment 24.

It should be understood that the wireless messages 110 may contain additional information as well. Examples of the additional information include status of how much battery power remains in the data storage equipment 24, status of how much battery power remains in the apparatus 22, tampering status of the data storage equipment 24, temperature and other ambient conditions (e.g., humidity), and so on.

In response to receipt of each wireless message 110, the data center circuitry 26 performs a set of operations to determine whether the apparatus 22 and the data storage equipment 24 are in a good situation or a bad situation. Along these lines, the data center circuitry 26 may log the wireless messages 110 along with the results of analyzing the information contained within the messages 110 into a repository. It should be understood that the data center circuitry 26 may identify situations as good or bad, e.g., based on analyzing the information from the apparatus 22 using a set of rules, policies, configuration settings, etc.

In accordance with certain embodiments, the data center circuitry 26 is able to query the apparatus 22 using wireless messages 110 for data storage equipment status (e.g., current location, positional integrity status, tamper status, power levels, ambient conditions, etc.). Such operation may take the form of a login followed by navigation among a set of webpages to obtain such status. The apparatus 22 may also send a return wireless message 110 to the data center circuitry 26 reporting that the apparatus 22 and the data storage equipment 24 have reached particular designated locations 102, and so on.

Moreover, when the data center circuitry 26 (or the apparatus 22) deems the data storage equipment 24 to be in a bad situation, the data center circuitry 26 may provide communications 120 such as an alert message to the operator 130 for that data storage equipment 24 (e.g., the owner of the data storage equipment 24). Such a communication 120 may include a notification as to why the data storage equipment 24 transitioned from being in a good situation to a bad situation (e.g., tipped on its side, dropped from an extreme height, etc.). Additionally, the data center circuitry 26 is able to query the apparatus 22 in response to communications 120 from the operator 130 for updates and further information regarding data storage equipment status. Accordingly, the operator 130 of the data storage equipment 24 may be able to take immediate remedial action rather than have to wait for information from the professional transportation company.

For example, when the apparatus 22 and the data storage equipment 24 are at the location 102(A), the wireless messages 110 from the apparatus 22 to the data center circuitry 26 may indicate the current positional integrity of the data storage equipment 24 and that the apparatus 22 and the data storage equipment 24 are at location 102(A). The wireless messages 110 may further indicate the current power levels of the power sources available to the apparatus 22, any sensed wireless networks and associated network strengths, current temperatures, current humidity, tampering status, and so on.

As the apparatus 22 and the data storage equipment 24 travel from the location 102(A) to the location 102(B), and so on along the predefined route 100, the apparatus 22 continues to send wireless messages 110 to the data center circuitry 26. Such wireless messages 110 include current positional integrity, current location data, current sensed information, current status, etc. while the data storage equipment 24 is moving.

In some arrangements, the apparatus 22 is configured to notify the data center circuitry 26 that the apparatus 22 and the data storage equipment 24 have reached the location 102(B). In these arrangements, the monitoring circuit 24 sends a wireless message 110 with such a notification as soon as it reaches the location 102(B) rather than wait for the next scheduled transmission of a wireless message 110. Accordingly, the apparatus 22 can send an alert message 120 to the data center circuitry 26 informing the operator 130 that the data storage equipment 24 has arrived at the location 102(B).

In alternative arrangements, the apparatus 22 simply sends wireless messages 110 containing positional integrity data and location data to the data center circuitry 26. When the data center circuitry 26 detects that the apparatus 22 and the data storage equipment 24 have reached the location 102(B), the data center circuitry 26 sends a message 120 to the operator 130 informing the operator 130 that the data storage equipment 24 has arrived at the location 102(B), and so on.

It should be understood that the technology disclosed above provides the framework for customizing access to the status of the data storage equipment 24 while the data storage equipment 24 is in transit. Other data, events, alerts, remedial actions, etc. and are suitable for use as well. Further details will now be provided with reference to FIG. 4.

Figure 4:
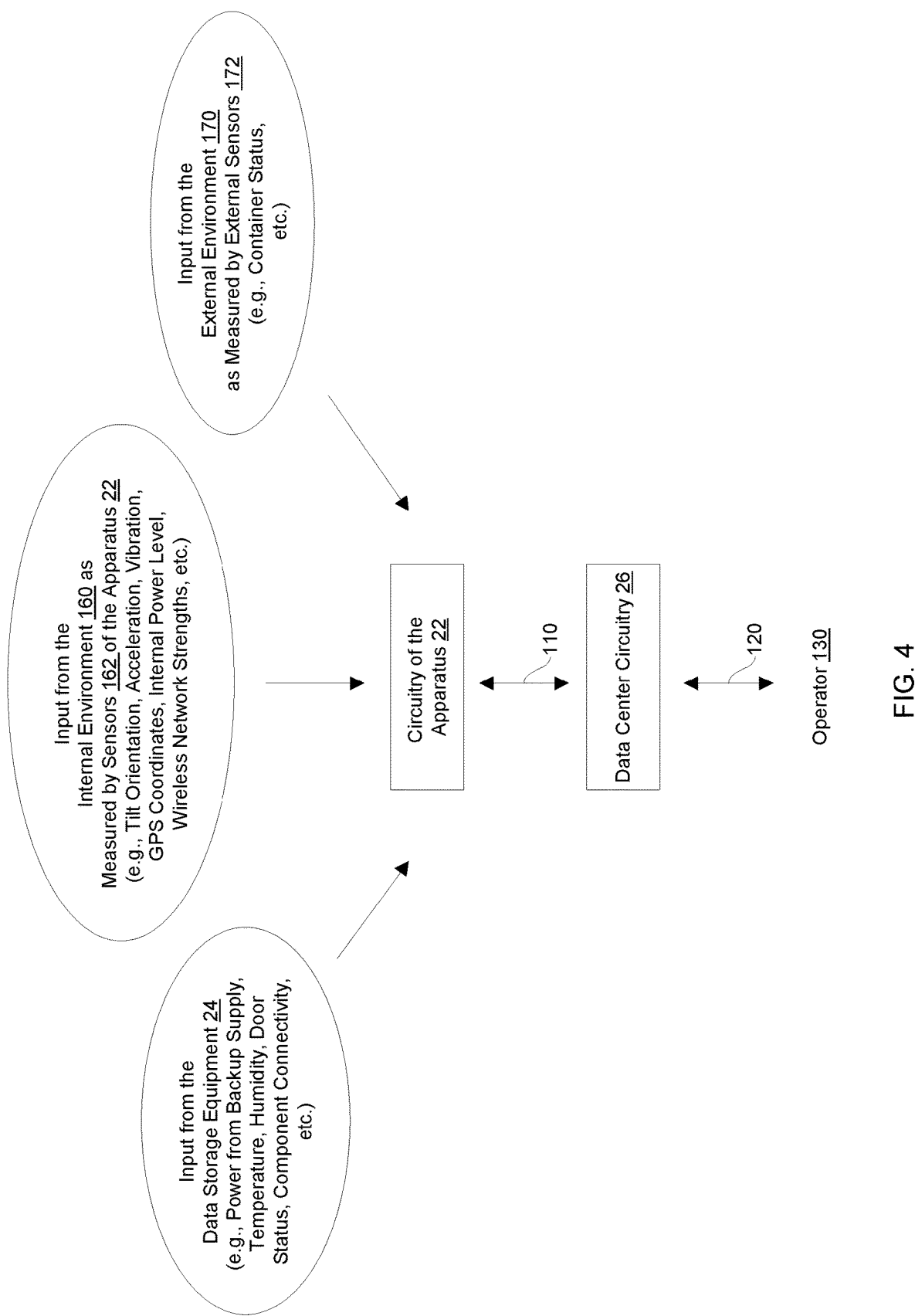
FIG. 4 is a block diagram illustrating particular details of how the electronic circuitry of FIG. 2 is able to identify and report occurrence of an abnormal event.

FIG. 4 shows particular details as to how the apparatus 22 operates to provide positional integrity status regarding the data storage equipment 24 to the data center circuitry 26. Such operation begins as soon as the apparatus 22 is activated to provide wireless messages 110 to the data center circuitry 26. The operator 130 (FIG. 3) is then able to access status via communications 120 for information that has already been received by the data center circuitry 26. In some arrangements, the operator 130 is able to direct the data center circuitry 26 to communicate back to the apparatus 22 via messages 110 in real time.

As shown in FIG. 4, the apparatus 22 receives data from different sources such as from the data storage equipment 24, from the internal environment 160 such as via sensors 162, and from the external environment 170 via other sensors 172. Such data reception occurs in an ongoing manner while the apparatus 22 is activated and has power (e.g., continuously, periodically, etc.).

Examples of data that the apparatus 22 can obtain from the data storage equipment 24 include sensor signals identifying motion of the data storage equipment 24, a power level of a backup power supply of the data storage equipment 24, temperature from a temperature sensor of the data storage equipment 24, status of whether doors or panels of the data storage equipment 24 are open/attached/missing/ etc., whether the components are properly plugged in or missing, and so on. Other data is suitable for receipt from the data storage equipment 24 as well.

Recall that the form factor of the apparatus 22 may be that of a tablet, a smart phone, a PDA, or similar style mobile device. Such apparatus 22 may be provisioned with a variety of motion sensing circuits, a transceiver (e.g., for cellular communications, for Ethernet communications, etc.), a tether to various parts of the data storage equipment 24 for power from the backup power supply of the data storage equipment 24 and for sensor signals, etc. Types of data that the apparatus 22 can obtain from the internal environment 160 via the sensors 162 include tilt orientation (e.g., via gyroscopes), vibration and shock (e.g., via accelerometers), temperature (e.g., via a set of temperature sensors), geolocation (e.g., via GPS circuitry), local network strengths, and so on. Other data is suitable for gathering from the sensors 162 as well (e.g., images, sounds, etc.).

Additionally, when the apparatus 22 has the physical form factor of a mobile device, the apparatus 22 can be augmented with other sensors 172 that are not part of the apparatus 22 or the data storage equipment 24 per se. Alternatively, the monitoring circuit 24 may take the form of a specialized apparatus that is particularly suited/provisioned with sensors 172 for monitoring the data storage equipment 24 (e.g., a customized assembly with attached sensors 172). The types of data that the apparatus 22 can obtain from the external environment 170 via the sensors 172 include higher precision vibration data (e.g., via more sophisticated vibration sensors), higher precision temperature (e.g., via a set of more sophisticated temperature sensors), and container status (e.g., whether panels/doors/ etc. have been opened or are missing, etc.). Other data is suitable for gathering from the sensors 172 as well (e.g., air quality, radiation exposure, etc.).

With the data then conveyed from the apparatus 22 to the data center circuitry 26, the data center circuitry 26 is able to automatically evaluate the data and determine whether an alert (or notification) should be sent to the operator 130 (see the communications 120 in FIGS. 3 and 4). Example alerts include positional integrity violation alerts, arrival alerts to indicate that the data storage equipment 22 has arrived at a planned location 102 (also see FIG. 3), a low power level alert to indicate that backup power from the data storage equipment 24 has dropped to a critically low level, a temperature out-of-range alert to indicate that the data storage equipment 24 resides at a location that has an unfavorable temperature, a tamper alert to indicate that a door/panel/etc. has been opened or that a storage device has been removed, and so on. Further details will now be provided with reference to FIG. 5.

Figure 5:
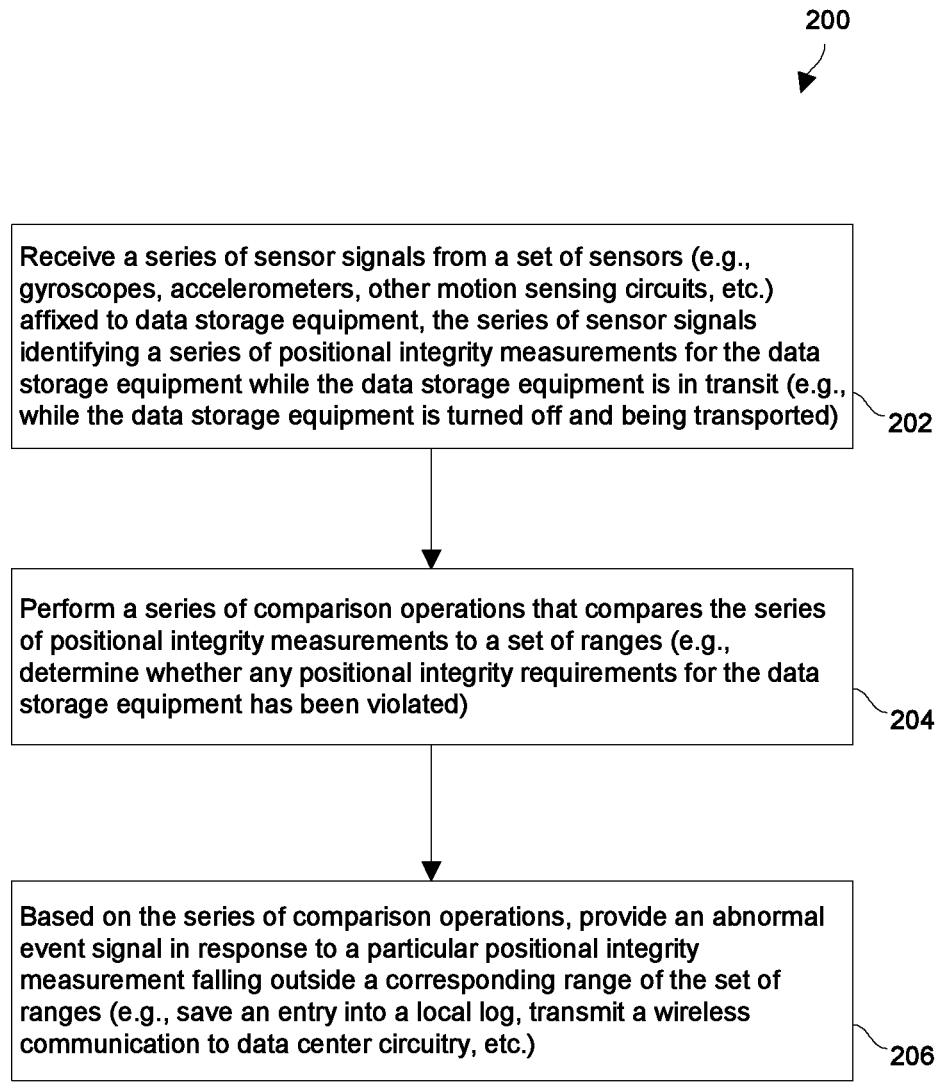
FIG. 5 is a flowchart of a procedure which is performed by specialized circuitry of the environment of FIG. 1.

FIG. 5 is a flowchart of a procedure 200 which is performed by specialized circuitry of the electronic environment 20 to monitor data storage equipment in transit (also see FIG. 1). In particular, the procedure 200 detects when an abnormal event occurs such as violation of positional integrity requirements while the data storage equipment is being moved from one location to another.

In some arrangements, the procedure 200 is performed exclusively by an apparatus which is affixed to the data storage equipment. In other arrangements, the procedure 200 is performed exclusively by data center circuitry while the apparatus simply operates as a conduit to convey sensor measurements to the data center circuitry. In yet other arrangements, the procedure is performed by a combination of the apparatus and the data center circuitry. It should be understood that the same procedure 200 can be performed at the same time for other data storage equipment.

At 202, the specialized circuitry receives a series of sensor signals from a set of sensors affixed to the data storage equipment. The series of sensor signals identifies a series of positional integrity measurements for the data storage equipment while the data storage equipment is in transit. During 202, the apparatus may consume power from the battery backup supply that normally provides battery backup power to the data storage equipment to enable the data storage equipment to continue to perform data storage operations after access to a primary power source is lost.

At 204, the specialized circuitry performs a series of comparison operations that compares the series of positional integrity measurements to a set of ranges. Such operations determine whether any positional integrity requirements for the data storage equipment are violated during transit.

At 206, the specialized circuitry provides, based on the series of comparison operations, an abnormal event signal in response to a particular positional integrity measurement falling outside a corresponding range of the set of ranges. Here, an entry may be made to a local log or repository of the apparatus and/or entered into a log or repository of the data center circuitry. Moreover, a notification may be sent to the operator of the data storage equipment.

As mentioned earlier, the apparatus which is co-located with the data storage equipment is electronically activated (e.g., in response to an activation command). In some arrangements, the apparatus is automatically activated (e.g., based on a control signal from the data center circuitry, based on a timer, etc.). In other arrangements, a human user manually activates the apparatus.

It should be understood that the apparatus may remain activated once the data storage equipment has reached its destination and is turned back on. Moreover, the apparatus may remain activated indefinitely, e.g., during the lifetime of the data storage equipment. Accordingly, the apparatus may continue to sense motion and report any detected positional integrity violations (e.g., when the customer later repositions the data storage equipment in a different location of the same room, a different room of the same building, a different customer facility, etc.).

As described above, improved techniques are directed to detecting an abnormal event while data storage equipment 24 is in transit. Such techniques involve electronically monitoring positional integrity of the data storage equipment 24 even when the data storage equipment 24 is turned off and being transported. Along these lines, an apparatus 22 affixes to the data storage equipment 24 and may utilize battery backup power from a battery backup power supply of the data storage equipment 24. Accordingly, the operator (or sender) 130 of the data storage equipment 24 will know if the mover mishandled the data storage equipment 24. In some arrangements, the apparatus 22 captures details of the abnormal event and may even wirelessly transmit such details in real time to the entity (e.g., via a data center) that originally provided the data storage equipment 24.

One should appreciate that the above-described techniques do not merely collect and analyze data. Rather, the disclosed techniques involve an improvement to the technology of identifying when data storage equipment 24 encounters a deleterious event. With such techniques, signals enable various circuits to change operation in response to motion signals, e.g., by providing entries within a log, by sending messages, etc. to indicate that position integrity of the data storage equipment has been violated thus enabling inspection, prevention of further similar events, etc.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the data center circuitry 26, host computers, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One should appreciate that there are lots of risks involved when a company is transporting an array from one location to the other. Such a company may heavily rely on a third party service to achieve it. Storage arrays and similar equipment may have specific requirements to land the product on at the target location in an upright position and also maintain the upright position throughout the course of travel and through warranty period of the product.

However, there scenarios where this can lead to issues for the sender:
  During travel, the third party shipping company may mishandle the data storage equipment which may lead to product issues.
  After landing at the customer site, mishandling by the customer may lead to product issues.
Without the improvements disclosed herein, the sender (or supplier) may never know of the occurrence such events. Both of these scenarios eventually costs the sender time, effort, expense, etc. in resolving issues arising from such mishandlings.

However, with the improvements disclosed herein, there is now a built-in mechanism for tracking positional integrity of the data storage equipment during product shipment and additionally/optionally through warranty period of the product. This mechanism can be used for transporting the data storage equipment and it can be further extended to any device that has similar positional integrity requirements—such as other computerized equipment, medical devices, etc.

In particular, in accordance with certain embodiments, an apparatus 22 receives and processes positional integrity information:
  A small foam-factor gadget running on a low powered chipset with specific circuitry (e.g., gyros, accelerometers, other motion sensing circuitry, etc.) for reading motion of the product that it is attached to.
  The low power gadget will draw power from data storage equipment's battery backup supply and/or directly from an independent battery.
  The gadget is fastened to (e.g., bolted onto) the product at manufacturing facility.
  The gadget includes a software algorithm to detect angular motion and compute if product ever failed to maintain allowed range of tilt/spin, etc.
  The algorithm detects sudden stop/acceleration that equates to an impact (e.g., an accident during shipment or accident when array being rolled from one customer lab to another).
  The algorithm detects continuous vibrations beyond acceptable range/rate that are tested at sender's facility/lab.
  The gadget has ability to transmit logs (e.g., to the sender's equipment over 3G/LTE, over a secure connection, over Bluetooth or other secure pairing in short ranges, etc.).
Accordingly, the sender can use the product logs to assess:
  If shipping company maintained the service level, and/or
  If warranty can be honored or not when customer reports issues The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of detecting an abnormal event while data storage equipment is in transit, the method comprising:
   receiving a series of sensor signals from a set of sensors affixed to the data storage equipment, the series of sensor signals identifying a series of positional integrity measurements for the data storage equipment while the data storage equipment is provided as unpowered cargo in transit, the set of sensors being powered regardless of whether the data storage equipment is turned on or turned off;
   performing a series of comparison operations that compares the series of positional integrity measurements to a set of ranges; and
   based on the series of comparison operations, providing an abnormal event signal in response to a particular positional integrity measurement falling outside a corresponding range of the set of ranges;
   wherein the set of sensors includes multiple motion sensing circuits;
   wherein the data storage equipment includes storage processing circuitry and a set of storage devices;
   wherein receiving the series of sensor signals from the set of sensors affixed to the data storage equipment includes:
   acquiring multiple motion signals from the multiple motion sensing circuits while the data storage equipment is turned off;
   wherein the storage processing circuitry of the data storage equipment includes a processor configured to communicate with the set of data storage devices to perform data storage operations on behalf of a set of host computers when the data storage equipment is turned on;
   wherein the data storage equipment includes a battery backup power source that is configured to provide battery backup power to the data storage equipment to enable the data storage equipment to perform data storage operations during loss of primary power from a primary power source;
   wherein the multiple motion sensing circuits reside within an apparatus that is attached to the data storage equipment;
   wherein acquiring the multiple motion signals from the multiple motion sensing circuits includes:
   obtaining the multiple motion signals in response to the apparatus consuming battery backup power from the backup power source of the data storage equipment;
   wherein the apparatus further includes an event log;
   wherein providing the abnormal event signal includes:
   storing an abnormal event entry in the event log of the apparatus, the abnormal event entry identifying the particular positional integrity measurement, a time for the particular positional integrity measurement, and a geolocation for the particular positional integrity measurement;
   wherein the apparatus further includes a wireless communications interface; and
   wherein providing the abnormal event signal further includes:
   transmitting an abnormal event notification to an external data center via the wireless communications interface.

2. A method as in claim 1;
   and wherein providing the abnormal event signal further includes:
   transmitting the event log to an external data center via the wireless communications interface.

3. A method as in claim 1, further comprising:
   storing other entries in the event log of the apparatus while the data storage equipment is in transit to enable the event log to describe a positional integrity history for the data storage equipment.

4. A method as in claim 1 wherein the multiple motion sensing circuits includes a set of gyroscope circuits; and
   wherein obtaining the multiple motion signals includes:
   receiving a series of gyroscope signals from the set of gyroscope circuits, the series of gyroscope signals identifying angular positioning of the data storage equipment while the data storage equipment is in transit.

5. A method as in claim 4 wherein performing the series of comparison operations includes:
   based on the series of gyroscope signals, comparing a series of angular positions of the data storage equipment to a set of tilt ranges to determine whether the data storage equipment violates an upright requirement imposed on the data storage equipment.

6. A method as in claim 1 wherein the multiple motion sensing circuits includes a set of accelerometer circuits; and
   wherein obtaining the multiple motion signals includes:
   receiving a series of accelerometer signals from the set of accelerometer circuits, the series of accelerometer signals identifying vibrational activity of the data storage equipment while the data storage equipment is in transit.

7. A method as in claim 6 wherein performing the series of comparison operations includes:
   based on the series of accelerometer signals, comparing a series of vibrational measurements of the data storage equipment to a set of vibration ranges to determine whether the data storage equipment violates vibration restriction imposed on the data storage equipment.

8. A method as in claim 1 wherein the multiple motion sensing circuits includes a global positioning system (GPS) circuit; and
   wherein obtaining the multiple motion signals includes:
   receiving a series of GPS signals from the GPS circuit, the series of GPS signals identifying a series of geolocations for the data storage equipment while the data storage equipment is in transit.

9. A method as in claim 8 wherein performing the series of comparison operations includes:
   based on the series of GPS signals, comparing the series of geolocations for the data storage equipment to a set of geolocation ranges to determine whether the data storage equipment violates a geolocation restriction imposed on the data storage equipment.

10. A method as in claim 1 wherein the multiple motion sensing circuits includes a set of gyroscope circuits, a set of accelerometer circuits, and a global positioning system (GPS) circuit, each of which consumes battery backup power from the backup power source of the data storage equipment while the data storage equipment is in transit; and wherein obtaining the multiple motion signals includes:

receiving a series of gyroscope signals from the set of gyroscope circuits, the series of gyroscope signals identifying angular positioning of the data storage equipment while the data storage equipment is in transit, receiving a series of accelerometer signals from the set of accelerometer circuits, the series of accelerometer signals identifying vibrational activity of the data storage equipment while the data storage equipment is in transit, and receiving a series of GPS signals from the GPS circuit, the series of GPS signals identifying a series of geolocations for the data storage equipment while the data storage equipment is in transit.

11. A method as in claim 10, further comprising:

after the storage processing circuitry of the data storage equipment is turned on, continuing to monitor the data storage equipment for another abnormal event based on positional integrity measurements while data storage equipment is turned on.

12. A method as in claim 1 wherein the set of sensors is part of an electronic apparatus that is separate and distinct from the data storage equipment; and wherein the electronic apparatus performs receiving the series of sensor signals, performing the series of comparison operations, and providing the abnormal event signal while the data storage equipment is turned off.

13. A method as in claim 12, further comprising:

consuming, by the electronic apparatus, battery backup power from the data storage equipment while the data storage equipment is turned off.

14. A method as in claim 1 wherein the set of sensors is part of an electronic apparatus that is separate and distinct from the data storage equipment; and wherein the method further comprises:

electronically tethering the electronic apparatus to an external port of the data storage equipment, wherein the electronic apparatus consumes battery backup power from the data storage equipment via the external port.

15. A method as in claim 1 wherein the set of sensors is provided in a mobile device distinct from the data storage equipment, wherein the data storage equipment further includes a backup power source for use when the data storage equipment is turned on and experiences a power failure, and wherein the method further includes:

powering the mobile device using the backup power source of the data storage equipment while the data storage equipment is turned off.

16. Data storage assembly, comprising:

data storage equipment which is constructed and arranged to perform data storage operations on behalf of a set of host computers; and an electronic apparatus which is constructed and arranged to detect an abnormal event while the data storage equipment is in transit, the electronic apparatus including:

a support member which is constructed and arranged to affix to the data storage equipment, memory supported by the support member, and control circuitry supported by the support member and coupled with the memory, the memory storing instructions which, when carried out by the control circuitry, cause the control circuitry to:

receive a series of sensor signals from a set of sensors affixed to the data storage equipment, the series of sensor signals identifying a series of positional integrity measurements for the data storage equipment while the data storage equipment is provided as unpowered cargo in transit, the set of sensors being powered regardless of whether the data storage equipment is turned on or turned off, perform a series of comparison operations that compares the series of positional integrity measurements to a set of ranges, and based on the series of comparison operations, provide an abnormal event signal in response to a particular positional integrity measurement falling outside a corresponding range of the set of ranges;

wherein the set of sensors includes multiple motion sensing circuits;

wherein the data storage equipment includes storage processing circuitry and a set of storage devices;

wherein causing the control circuitry to receive the series of sensor signals from the set of sensors affixed to the data storage equipment includes causing the control circuitry to:

acquire multiple motion signals from the multiple motion sensing circuits while the data storage equipment is turned off;

wherein the storage processing circuitry of the data storage equipment includes a processor configured to communicate with the set of data storage devices to perform data storage operations on behalf of a set of host computers when the data storage equipment is turned on;

wherein the data storage equipment includes a battery backup power source that is configured to provide battery backup power to the data storage equipment to enable the data storage equipment to perform data storage operations during loss of primary power from a primary power source;

wherein the multiple motion sensing circuits reside within the electronic apparatus that is attached to the data storage equipment; and wherein causing the control circuitry to acquire the multiple motion signals from the multiple motion sensing circuits includes causing the control circuitry to:

obtain the multiple motion signals in response to the apparatus consuming battery backup power from the backup power source of the data storage equipment;

wherein the apparatus further includes an event log;

wherein providing the abnormal event signal includes causing the control circuitry to:

store an abnormal event entry in the event log of the apparatus, the abnormal event entry identifying the particular positional integrity measurement, a time for the particular positional integrity measurement, and a geolocation for the particular positional integrity measurement;

wherein the electronic apparatus further includes a wireless communications interface; and wherein causing the control circuitry to provide the abnormal event signal further includes causing the control circuitry to:

transmit an abnormal event notification to an external data center via the wireless communications interface.

17. Electronic apparatus to detect an abnormal event while data storage equipment is in transit, the electronic apparatus comprising:
a support member which is constructed and arranged to affix to the data storage equipment;
memory supported by the support member; and
control circuitry supported by the support member and coupled with the memory, the memory storing instructions which, when carried out by the control circuitry, cause the control circuitry to:
receive a series of sensor signals from a set of sensors affixed to the data storage equipment, the series of sensor signals identifying a series of positional integrity measurements for the data storage equipment while the data storage equipment is provided as unpowered cargo in transit, the set of sensors being powered regardless of whether the data storage equipment is turned on or turned off,
perform a series of comparison operations that compares the series of positional integrity measurements to a set of ranges, and
based on the series of comparison operations, provide an abnormal event signal in response to a particular positional integrity measurement falling outside a corresponding range of the set of ranges;
wherein the set of sensors includes multiple motion sensing circuits;
wherein the data storage equipment includes storage processing circuitry and a set of storage devices;
wherein causing the control circuitry to receive the series of sensor signals from the set of sensors affixed to the data storage equipment includes causing the control circuitry to:
acquire multiple motion signals from the multiple motion sensing circuits while the data storage equipment is turned off;
wherein the storage processing circuitry of the data storage equipment includes a processor configured to communicate with the set of data storage devices to perform data storage operations on behalf of a set of host computers when the data storage equipment is turned on;
wherein the data storage equipment includes a battery backup power source that is configured to provide battery backup power to the data storage equipment to enable the data storage equipment to perform data storage operations during loss of primary power from a primary power source;
wherein the multiple motion sensing circuits reside within the electronic apparatus that is attached to the data storage equipment;
wherein causing the control circuitry to acquire the multiple motion signals from the multiple motion sensing circuits includes causing the control circuitry to:
obtain the multiple motion signals in response to the apparatus consuming battery backup power from the backup power source of the data storage equipment;
wherein the apparatus further includes an event log;
wherein providing the abnormal event signal includes causing the control circuitry to:
store an abnormal event entry in the event log of the apparatus, the abnormal event entry identifying the particular positional integrity measurement, a time for the particular positional integrity measurement, and a geolocation for the particular positional integrity measurement;
wherein the electronic apparatus further includes a wireless communications interface; and
wherein causing the control circuitry to provide the abnormal event signal further includes causing the control circuitry to:
transmit an abnormal event notification to an external data center via the wireless communications interface.

18. Electronic apparatus as in claim 17, further comprising the set of sensors;
wherein the electronic apparatus is separate and distinct from the data storage equipment; and
wherein the control circuitry is constructed and arranged to receive the series of sensor signals, perform the series of comparison operations, and provide the abnormal event signal while the data storage equipment is turned off.

19. A method of detecting an abnormal event while data storage equipment is in transit, the method comprising:
receiving a series of sensor signals from a set of sensors affixed to the data storage equipment, the series of sensor signals identifying a series of positional integrity measurements for the data storage equipment while the data storage equipment is provided as unpowered cargo in transit, the set of sensors being powered regardless of whether the data storage equipment is turned on or turned off;
performing a series of comparison operations that compares the series of positional integrity measurements to a set of ranges; and
based on the series of comparison operations, providing an abnormal event signal in response to a particular positional integrity measurement falling outside a corresponding range of the set of ranges;
wherein the set of sensors includes multiple motion sensing circuits;
wherein the data storage equipment includes storage processing circuitry and a set of storage devices;
wherein receiving the series of sensor signals from the set of sensors affixed to the data storage equipment includes:
acquiring multiple motion signals from the multiple motion sensing circuits while the data storage equipment is turned off;
wherein the storage processing circuitry of the data storage equipment includes a processor configured to communicate with the set of data storage devices to perform data storage operations on behalf of a set of host computers when the data storage equipment is turned on;
wherein the data storage equipment includes a battery backup power source that is configured to provide battery backup power to the data storage equipment to enable the data storage equipment to perform data storage operations during loss of primary power from a primary power source; and
wherein the multiple motion sensing circuits reside within an apparatus that is attached to the data storage equipment; and
wherein acquiring the multiple motion signals from the multiple motion sensing circuits includes:
obtaining the multiple motion signals in response to the apparatus consuming battery backup power from the backup power source of the data storage equipment;

wherein the apparatus further includes an event log;
wherein providing the abnormal event signal includes:
storing an abnormal event entry in the event log of the apparatus, the abnormal event entry identifying the particular positional integrity measurement, a time for the particular positional integrity measurement, and a geolocation for the particular positional integrity measurement;
wherein the apparatus further includes a wireless communications interface; and
wherein providing the abnormal event signal further includes:
transmitting an event log to an external data center via the wireless communications interface.

20. A method as in claim 19, further comprising:
storing other entries in the event log of the apparatus while the data storage equipment is in transit to enable the event log to describe a positional integrity history for the data storage equipment.

\* \* \* \* \*